United States Patent
Maile et al.

(10) Patent No.: US 9,723,848 B2
(45) Date of Patent: Aug. 8, 2017

(54) METHOD AND DEVICE FOR SIMPLIFIED ALIGNMENT OF A FILLING MACHINE FOR SAUSAGE PRODUCTION

(71) Applicant: ALBERT HANDTMANN MASCHINENFABRIK GMBH & CO. KG, Biberach (DE)

(72) Inventors: Bernd Maile, Oggelshausen (DE); Martin Staudenrausch, Biberach (DE); Marcel Nusser, Biberach (DE)

(73) Assignee: Albert Handtmann Maschinenfabrik GmbH & Co. KG, Biberach (DE)

(*) Notice: Subject to any disclaimer, the term of this patent is extended or adjusted under 35 U.S.C. 154(b) by 0 days.

(21) Appl. No.: 15/220,206

(22) Filed: Jul. 26, 2016

(65) Prior Publication Data
US 2017/0027182 A1 Feb. 2, 2017

(30) Foreign Application Priority Data
Jul. 30, 2015 (EP) .................................. 15179017

(51) Int. Cl.
*A22C 11/02* (2006.01)
(52) U.S. Cl.
CPC .......... *A22C 11/0245* (2013.01); *A22C 11/02* (2013.01)
(58) Field of Classification Search
CPC .. A22C 11/02; A22C 11/0245; A22C 11/0254
USPC ............................................. 452/31, 35, 37
See application file for complete search history.

(56) References Cited

U.S. PATENT DOCUMENTS

| | | | | |
|---|---|---|---|---|
| 4,558,488 A | * | 12/1985 | Martinek | A22C 11/0245 452/31 |
| 4,621,482 A | | 11/1986 | Crevasse et al. | |
| 4,709,450 A | * | 12/1987 | Stanley | A22C 11/0245 452/31 |
| 4,747,767 A | | 5/1988 | Schnell | |
| 4,766,645 A | * | 8/1988 | Lamartino | A22C 11/0245 452/31 |
| 4,837,897 A | * | 6/1989 | Lamartino | A22C 11/0245 452/31 |
| 5,947,809 A | * | 9/1999 | Schliesser | A22C 11/0245 452/31 |

(Continued)

FOREIGN PATENT DOCUMENTS

EP 0198486 A1 10/1986
EP 0226925 A2 7/1987

(Continued)

OTHER PUBLICATIONS

European Patent Office, European Search Report Issued in Application No. 15179017.7, Feb. 3, 2016, 10 pages. (Submitted with Partial Translation).

*Primary Examiner* — David Parsley
(74) *Attorney, Agent, or Firm* — McCoy Russell LLP

(57) ABSTRACT

The present disclosure relates to a method for aligning a filling machine and a respective filling machine. In the method, the height and/or the inclination of the filling machine is first measured according to an actual state. The measured values are transmitted to a calculation unit. The actual state of the height and/or the inclination is compared with a target state of the height and/or the inclination. The height and/or the inclination of the filling machine are then adjusted on the basis of the comparison.

8 Claims, 3 Drawing Sheets

(56) References Cited

U.S. PATENT DOCUMENTS

| | | | | |
|---|---|---|---|---|
| 6,245,369 | B1* | 6/2001 | Kobussen | A23P 30/25 425/140 |
| 6,248,013 | B1* | 6/2001 | Thomas | A22C 17/0013 452/138 |
| 7,553,222 | B2* | 6/2009 | Jackel | A22C 11/0245 452/38 |
| 2001/0023170 | A1 | 9/2001 | Meier et al. | |

FOREIGN PATENT DOCUMENTS

| | | |
|---|---|---|
| EP | 0275487 A1 | 7/1988 |
| EP | 0352825 A2 | 1/1990 |
| EP | 1172035 A1 | 1/2002 |

* cited by examiner

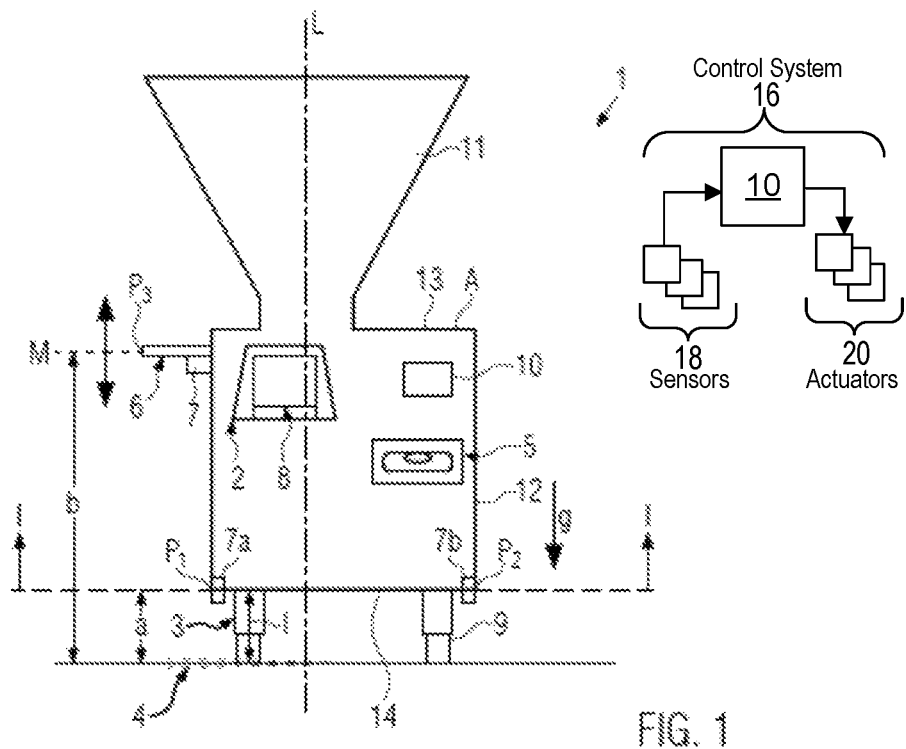
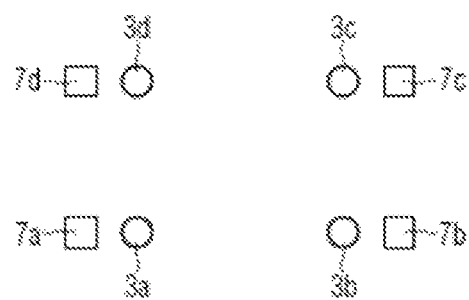
FIG. 2

METHOD AND DEVICE FOR SIMPLIFIED ALIGNMENT OF A FILLING MACHINE FOR SAUSAGE PRODUCTION

CROSS REFERENCE TO RELATED APPLICATION

The present application claims priority to European Patent Application No. 15 179 017.7, entitled "METHOD AND DEVICE FOR SIMPLIFIED ALIGNMENT OF A FILLING MACHINE FOR SAUSAGE PRODUCTION," filed Jul. 30, 2015, the entire contents of which is hereby incorporated by reference for all purposes.

TECHNICAL FIELD

The present disclosure relates to a method for aligning a filling machine, in particular for sausage production.

BACKGROUND AND SUMMARY

When placing filling machines into operation in a production environment, it is commonly ensured that the latter is leveled in height. It is additionally attempted to align the filling machine as level as possible. It can in rare cases be advantageous to create a specific intentional inclination in one or more directions (for example, for aligning the filling machine with a likewise inclined attached machine).

It frequently happens that floors in medium-size and industrial production facilities have a certain inclination in different directions, for example, 2%, so that detergents and waste water accumulating when the machine or the building is cleaned can selectively be drained. Conventionally, the height is adjusted intuitively or aided, for example, by a tape measure. For example, the feet of the filling machines are then by threads adjusted in height so that the stuffing tube of the machine is at a certain height above the floor (for example, for being attached to matching attached machines of the downstream process or for ergonomic reasons). For aligning the inclination of the filling machine, either no measuring tool used (instead estimates or eyeball judgment), or for instance a mechanic's level is used.

Adjusting several machine feet is sometimes strength- and time-consuming, since the effect of adjusting one individual machine foot can only with difficulty be estimated for the entire adjustment result and it does occur that the filling machine rocks on two machine feet or that one machine foot is without floor contact. For larger inclinations of the ground or the floor under the machine, machine feet must be adjusted individually in very different way (in the number of adjustment turns) to obtain the desired result.

With uneven floors, several iteration steps are therefore frequently necessary, even for experienced personnel, in order to adjust the filling machine to take an exact height and alignment position. Experience shows that the result must be repeatedly checked and corrected during the adjustment process.

The consequence of this is that filling machines are in practice not always optimally aligned. Another disadvantage comes into play in practice when attached machines that are coupled to the filling machine are due to an incorrectly set height of the filling machine in part or entirely suspended with their weight either on the outlet of the filling machine or try to push the latter upwardly—strong mechanical stress acts upon the affected components, which can lead to physical deformation, cracks or breaking, possibly resulting in high follow-up costs.

Proceeding from there, the present disclosure is based on the object to provide a method for aligning a filling machine and a respective filling machine which enable that the filling machine can in a simple and reliable manner be aligned in its height and/or inclination.

According to the present disclosure, the height and/or the inclination of a filling machine is then being measured for an actual state. In one example, the height and the inclination are determined, because then the filling machine can be positioned exactly with a predetermined inclination at a predetermined height.

The height of the filling machine is presently to be understood, for example, as the distance of an assembly reference point to the floor on which the feet of the filling machine are positioned. Where this reference point is located is irrelevant because the position of a specific point at the machine, for example, the height of the stuffing tube axis, can due to known machines dimensions always be determined.

Measuring the inclination is understood to mean measuring certain values that can be used to determine, for example, the inclination of a system reference plane (for example, relative to a reference plane, in particular to the horizontal plane). An assembly reference plane is, for example, a plane which extends perpendicular to the longitudinal axis L of the machine, e.g. a plane including a flat surface of the machine housing, or a plane parallel thereto.

The measured values are then transmitted to a calculation unit of the filling machine, which can be part of a machine controller. The calculation unit then compares the actual state of the height and/or the inclination with a respective target state of the height and/or inclination.

For example for the height, the measured values can there either be directly compared or computed values depending on the measured values can be compared with respective target values. The calculation device can, for example, convert the measured height of a reference point to a different reference point. The calculation unit can, for example, also determine a system reference plane on the basis of the measured values for the inclination of the filling machine and by comparison detect the deviation of the inclination of the assembly reference plane to the inclination of a horizontal plane that intersects the plane and that is perpendicular to the gravitational vector "g". It is also by way of trigonometric functions possible to convert detected inclination angles into distances (for example, the distance between the machine base and the ground under the machine at certain locations, e.g. in the region of the machine feet) and compare them.

The height and/or the inclination can be adjusted on the basis of the comparison such that a target state is obtained.

The present disclosure may enable that a correct height of the filling machine can always be adjusted so that, for example, a stuffing tube is correctly aligned to a downstream attached machine. With precise, e.g. leveled alignment of the filling machine, process reliability can be increased and stability can be ensured, even if the floor in the production room is uneven. Principles that work with the aid of gravity can have an optimal effect. However, it is also possible to set a predetermined inclination of the assembly reference plane, where a machine positioned in an inclined manner requires this.

Improved alignment of the filling machine can be ensured in a simple, reliable and reproducible manner.

It can be calculated on the basis of a deviation between the actual and the target state how the filling machine must be aligned via appropriate adjustment elements to obtain the target state with respect to the height and/or inclination, in particular in which direction and by what magnitude (Δa) the filling machine must be adjusted in height at various points by respective machine feet. The points in one embodiment may be located in the corner regions of the filling machine. The points can correspond to the positions of the machine feet.

It can, on the basis of a deviation between the actual and the target state, be also calculated how the respective adjustment elements must be adjusted to obtain the target state with respect to the height and/or inclination, in particular in which direction and by what magnitude the machine feet of the filling machine must be adjusted in height. It can therefore in the calculation unit by calculating be accurately calculated how the operator must adjust the adjustment elements. It can be indicated for each machine foot how it is to be adjusted, i.e. for example, by how many turns and in what direction a thread of the adjustable machine feet must be turned. Calculating by what magnitude and in which direction the filling machine must be adjusted in height by the adjustment elements allows for even easier handling and faster adjustment as compared with the mere indication of a deviation on an indicator.

It is possible that an indication is given that indicates a deviation between the actual and the target state, so that the operator can quickly and easily recognize this deviation and make an appropriate adjustment. The indicator advantageously also shows a recommendation for action as to how to adjust the respective adjustment elements, in particular, for height adjustment of the machine feet of the filling machine. The recommendation for action there at least indicates the direction in which the individual adjustment elements or machine feet are to be adjusted in height—and may advantageously also indicate by what magnitude.

However, it is also possible that the height and/or inclination in step d is done automatically, i.e. that drives (hydraulic, pneumatic) or actuators are automatically actuated for height adjustment of the machine feet. The filling machine is then able to independently indicate their position deviating from the target state and automatically perform corrections. Implementing an automatic control is then advantageous. Inspection of the actual state and comparison with the target state can alternatively be performed once at the beginning of the adjustment process, continuously, or cyclically during the adjustment process.

It can there be advantageous to have steps for inspecting the state again and only terminate the adjustment process when it is in a new comparison determined that the current state corresponds to the target state.

An optical or acoustic indication is advantageously given when the target state in terms of height and/or inclination is reached, so that the operator knows that the filling machine is now in the target state. However, it is also possible that an optical or acoustic indication is given already for adjustment of the individual adjustment elements, when the adjustment element has been correctly adjusted, that the filling machine has by the respective adjustment element been moved by the correct magnitude in the correct direction. A respective feedback significantly facilitates the adjustment process since the operator, when being located in the region of the bottom of the machine for adjusting the machine feet, instantly recognizes when the machine foot is in the correct position. An acoustic feedback is there particularly advantageous. However, the indication can also be effected in a respective display. The height can then be adjusted very precisely, as for example, also fractions of a screw rotation can be performed accurately. It can then also be sufficient if only the direction of height adjustment is given as an instruction for action.

A respective measurement for determining whether the adjustment element has been correctly adjusted, for example, a height measurement from the ground is taken, or it is determined by measuring how far the actuator is turned out when an actuator is operated by the operator, when the height adjustment is completed. The same can also be accomplished by signals of a respective stepping motor or a servo drive with a rotary encoder (resolver, incremental encoder, absolute encoder, etc.).

The measured actual state of the height and/or inclination can be effected by way of measured values from at least one measuring device integrated into the filling machine and/or measured values from an external measuring device. An integrated measuring device has the advantage that no additional instruments or tools are required, and no suitable tool must therefore be quickly available and no knowledge of handling a respective measuring device is required. This is advantageous in particular also in view of the risk of damage and hygiene. However, it is also possible that an external measuring device is provided which feeds the measured values, for example via cable or radio connection, Bluetooth, etc., to the calculation unit. Moreover, it is possible that an operator measures respective values and manually enters them into the calculation device.

The target state can be at least one of the following states:
a height of at least one assembly reference point,
a horizontally oriented assembly reference plane, and
an assembly reference plane that is inclined relative to a horizontal plane, where said plane is inclined by the corresponding respectively predetermined angle about one or more axes. The filling machine can thus be inclined in angular positions specifically selected in deviation from the theoretical level position.

A filling machine may comprise a machine housing, a hopper, a stuffing tube, and machine feet.

According to the present disclosure, the filling machine may comprise a calculation unit in which measured values pertaining to the actual state of the height and/or inclination as well as values relating to the target state of the height and/or inclination can be stored, where the calculation unit may comprise a comparison device which is provided for comparison of the actual state with the target state in terms of the height and/or the inclination, and at least one adjustment element which is to be adjustable based on the comparison of the actual to the target state. The calculation device can be configured such that it can calculate on the basis of a deviation between the actual and the target state how the filling machine must be aligned via appropriate adjustment elements to obtain the target state with respect to the height and/or inclination, in particular in which direction and by what magnitude (Δa) the filling machine must be adjusted in height at various points by way of respective machine feet.

The calculation unit can also calculate how respective adjustment elements must be adjusted to obtain the target state with respect to the height and/or the inclination, in particular in what direction and by what magnitude the machine feet of the filling machine must be adjusted in height. "In which direction" presently means that the machine is to be raised or lowered at the respective foot.

The filling machine in one example may have a display that indicates a deviation of the actual from the target state and/or a recommendation for action to adjust respective adjustment elements in particular for height adjustment of the machine feet of the filling machine. The filling machine advantageously comprises at least one adjustment element, in some examples four feet adjustable in height, where the at least one adjustment element respectively comprises one actuator which is actuated—in particular automatically—by the calculation device unit a corresponding target value has been reached. This can occur automatically via the calculation unit or, e.g. by an operator, and in some examples this may occur in accordance with an instruction for action. The filling machine advantageously comprises a visual and/or audible indicator that indicates when the target state regarding the height and/or inclination has been reached and/or indicates when an adjustment element has been correctly adjusted.

The filling machine comprises at least one measuring device for recording the actual state regarding the height and/or inclination and/or an input device for entering measured values regarding the height and/or inclination pertaining to the actual state.

The filling machine comprises at least one sensor, in some embodiments a distance sensor, for measuring the actual state of the height and/or the inclination. The sensors are arranged in particular at different corner regions of the filling machine. It can then be determined or calculated, for example, by way of distance sensors in the region of a respective machine foot, when a machine foot is correctly adjusted in height.

It may be particularly advantageous according to the present disclosure when both the height of the filling machine as well as the inclination are determined. This entails the possibility of correct, simple and reproducible adjustment, in particular on uneven floors. The filling machine can then be aligned having a predetermined inclination at a predetermined height.

BRIEF DESCRIPTION OF THE FIGURES

The present disclosure shall be explained below in more detail with reference to the following Figs.

FIG. 1 very schematically shows a side view of a filling machine according to the present disclosure.

FIG. 2 shows a sectional view through the filling machine along line I-I.

DETAILED DESCRIPTION

Figure 3:
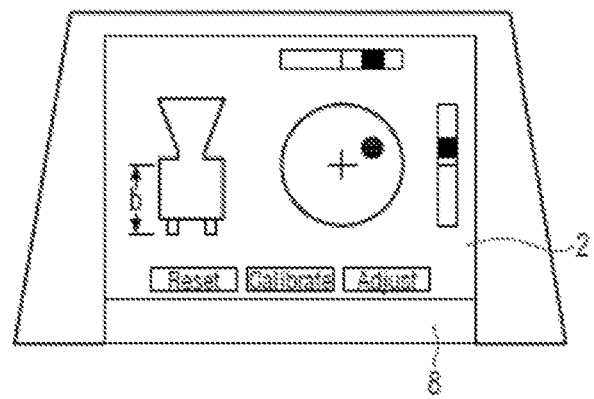
FIG. 3 very schematically shows an indicator of the filling machine.

FIG. 1 very schematically shows a side view of a filling machine according to the present disclosure. This filling machine may be used for filling foods, e.g. for manufacturing sausages. The filling machine comprises a hopper 11 into which pasty mass can be filled and ejected through a stuffing tube 6 via a conveyor—not illustrated—into a sausage casing. Downstream of a respective filling machine in a filling line are further attached machines, such as transport devices, clippers, sausage grinders, hanging lines, etc, to which the filling machine must be correctly aligned. The filling machine further comprises a machine housing 12 which has a surface 13 and a base 14. The surface can be configured to be flat, e.g. extend at a right angle to the side wall, or may slant outwardly or be curved, so that water can be drained. The machine is positioned on machine feet 3, presently four machine feet 3a, b, c, d in each corner region of the housing. Machine feet 3 comprise adjustment elements 9 via which the height of filling machine 1 can be measured, i.e. the height of a reference point, presently the distance between reference point P1, P2, P3 to the ground or floor 4 under the machine.

As shown in FIG. 1, the floor or ground 4 under the machine, as shown by the dashed lines, can be inclined. Since stuffing tube 6 and center axis M must be correctly arranged at a certain height or relative to a downstream attached machine, height b between the center axis of stuffing tube 6 and floor 4 must be precisely set and adjusted to uneven floors. Also an assembly reference plane A, e.g. a plane extending perpendicular to the longitudinal axis of the machine, for example a plane including surface 13 of the housing, or a plane which is spanned by at least three corner points at the lower end of the machine housing is to be aligned, for example, horizontally, i.e. perpendicular to gravity g. However, at least center axis M of stuffing tube 6 is to be advantageously located in a respective plane which extends perpendicular to the gravity vector and can also be aligned perpendicular to gravity vector g, or perpendicular to longitudinal axis L of the filling machine, respectively. However, it is also conceivable that the filling machine is to be positioned inclined relative to a horizontal plane, as shall be explained below in more detail.

Filling machine 1 can be aligned accordingly by way of height adjustment of adjustment elements 9 of machine feet 3. The adjustment element can there e.g. comprise a thread, where the height of the feet can be adjusted by turning the lower portion of the feet in the thread by a certain number of revolutions. The adjustment element, however, can be actuated not only manually, but a drive can alternatively be provided, for example, an actuator, or a hydraulic drive, with which—like with manual adjustment—dimension 1 of machine feet 3 and thereby the height and inclination of filling machine 1 is adjustable.

The filling machine according to the present disclosure comprises a calculation unit 10 in which measured values pertaining to the actual state of the height and/or the inclination and values pertaining to the target state of the height and/or inclination can be stored.

To measure the height of the filling machine, at least one measuring device 7 can be provided, in particular in the form of a distance sensor, which can measure the distance from a reference point P1, P2, P3 to ground 4 under the machine.

FIG. 1 shows distance sensors 7a, 7b only by way of example, where this embodiment can also have respective distance sensors disposed in the corner regions at feet 3d and 3c. Respective distance measured values a, for example, presently measuring the distance between machine base 14 and ground 4 under the machine, are passed to calculation device 10.

Calculation device 10, also referred to as calculation unit 10, may comprise a portion of a control system 16. Control system 16 is shown receiving information from a plurality of sensors 18 (various examples of which are described herein) and sending control signals to a plurality of actuators 20 (various examples of which are described herein). As one example, sensors 18 may include distance sensors such as distance sensors 7a, 7b.

The distance sensors may be any of optical sensors, sensors for distance measurement on the basis of a propagation-time measurement and/or a reflection (e.g., infrared, laser, sound, ultrasound), or a force-sensitive and/or spring-actuated sensor/push button, for example. As another example, the sensors may include inclination sensors such as inclination sensor 5. The inclination sensors may be microelectromechanical spring-mass systems, devices for measuring pressure at multiple points of support, optical measuring devices, laser tracking, optical plummet, laser plummet, gyroscope, or a strain gauge/force transducer, which may be attached to the filling machine and detect the actual position and orientation of the filling machine. Furthermore, sensors 18 may include devices for inductive or capacitive measurement that may be provided and attached to the filling machine to detect the position and orientation of the filling machine by way of distance measurement. Further still, a Ferraris acceleration sensor can be used, as well as piezoelectric sensing elements, or mercury-silver-inclination switches for detecting inclination, in some examples. In still other examples, the sensors 18 may include sensors for communicating over wirelessly with an external device. The actuators of control system 16 may include drives for height adjustments of machine feet 3. For example, the drives may be electric, hydraulic, or pneumatic drives.

The calculation device 10 may receive input data from the various sensors 18, process the input data, and trigger the actuators 20 in response to the processed input data based on instruction or code programmed therein corresponding to one or more routines. Example control routines are described herein with regard to FIG. 5.

Additionally or alternatively, a distance sensor 7 can be provided, for example, also in the region of stuffing tube 6 via which the distance b is measured between central axis M of the stuffing tube and ground 4 under the machine and passed to calculation device 10. It can therewith be determined directly or indirectly at which height stuffing tube 6 is disposed, wherein calculation device 10 can based on a target-actual comparison determined whether stuffing tube 6 is in a correct position. Reference point P of the measurement, however, is irrelevant since the position of the center axis of the stuffing tube can also be determined or calculated from other measurement points, e.g. P1, P2 based on the known dimensions of the filling machine. For example, optical sensors or a device for distance measurement on the basis of a propagation-time measurement and/or a reflection (e.g., infrared, laser, sound, ultrasound), or also a force-sensitive and/or spring-actuated sensor/push button can be used as distance sensors. Furthermore, the respective height can be measured not only by way of an electronic measuring device but also manually by way of a meter stick, level pole etc. and entered via a schematically illustrated input unit 8 and passed to calculation unit 10.

Measured values pertaining to the inclination can advantageously also be stored in calculation unit 10. For this purpose, filling machine 1 may comprise an integrated inclination sensor 5 which transmits respective measured values to calculation device 10. It is also possible that the inclination sensor is not integrated into the filling machine but that an external inclination measuring device (not shown) is provided, which bears, for example, against surface 13 or a side wall of filling machine 1, and the measured values recorded with respect to the inclination are passed to calculation device 10 either via cable or a wireless connection, Bluetooth etc. It is also possible that the measured values generated by the external inclination measuring device are entered by the operator via an input unit 8 and are thus stored in calculation device 10. For measuring the inclination, for example, devices are available that determine the inclination with the aid of a physical principle of action or effect. Suitable for this are, for example, microelectromechanical spring-mass systems, devices for measuring pressure at multiple points of support, presently pressure measurement at the foot area facing ground 4 under the machine, optical measuring devices, in particular cameras, laser tracking, optical plummet, laser plummet, gyroscope, strain gauge/force transducer, which are attached to the filling machine and detect the actual position and orientation of the filling machine. Furthermore, devices for inductive or capacitive measurement can be provided and attached to the filling machine and detect the position and orientation of the filling machine by way of distance measurement. Furthermore, a Ferraris acceleration sensor can be used, as well as piezoelectric sensing elements, or mercury-silver-inclination switches or even electronic spirit levels, where electronic spirit levels may include digital level tools providing a digital level indication, for example. However, reading analog spirit levels with a readable angle display is also possible, where respective angles can then be entered into input unit 8. Finally, the inclination can also be determined by way of at least three distance sensors which may be located in a plane perpendicular to longitudinal axis L and measure the distance to ground 4, e.g. distance sensors 7a, b, (c, d not shown) at the four corner regions of the filling machine.

Target values for a target state can also be entered into calculation device 10 such that the actual state can in calculation device 10 be compared with the target state with respect to the height and/or inclination of the filling machine. For this purpose, the calculation device advantageously comprises a comparison device. The comparison device can, for example, either directly compare the measured values with corresponding target measured values or compare values that were determined on the basis of the measured values with corresponding target values. The target state or the corresponding values, respectively, are entered either manually via the input unit of calculation unit 10 or determined automatically, for example, in that the height is measured by a respective measuring device of the downstream attached machine. Respective target values are alternatively already in the factory stored in a machine controller. A target state can be, for example, one of the following states:
- a height of at least one assembly reference point P, where the value to be compared corresponds either to a measured value or is calculated from the measured value,
- a horizontally oriented assembly reference plane $A_{soll}$,
- an assembly reference plane inclined relative to the horizontal plane, meaning, that the assembly reference plane is inclined relative to a horizontal plane by a respective angle about one or more axes, i.e. that it is desirable that the filling machine is in selected and defined angular positions inclined in deviation from the theoretical level position.

For comparison of the inclination of the actual assembly reference plane, for example, the measured inclination angles about one or more axes of the assembly reference plane are compared with the respective inclination angles of the target assembly reference plane (for example, horizontal inclination angle=0).

It is also possible to convert detected inclination angles into distances by way of trigonometric functions (for example, the distance between the machine base and the ground under the machine at certain locations, e.g. in the region of the machine feet) and compare them. This distance information can be used or converted for different positions, advantageous is the conversion relative to individual adjustment elements 9 of machine feet 3 and/or positions at which a respective distance sensor 7a, b is arranged.

It can then be calculated geometrically how the filling machine must be aligned by way of respective adjustment elements, e.g. height-adjustable machine feet, for the assembly reference plane to be at a certain inclination and located at a certain height.

The orientation of the filling machine or of the actual assembly reference plane A, respectively, which differs from the in particular horizontal target assembly reference plane $A_{soll}$, can be displayed in an abstract manner or with realistic images, measurement data/numbers or diagrams on an indicator, i.e. display 2 (see also FIG. 3). The respective inclination angles can alternatively also be converted as described above by way of trigonometric functions, i.e., the indication can be also be effected with distance information.

When calculating by what height and in which direction the machine needs to be adjusted in height at different locations, specific recommendations for actions (gradually or simultaneously) can be given and indicated for adjusting the adjustment elements (for example, thread turns) and thereby the orientation of the filling machine and for bringing to the target state. A further development stage can be to realize the adjustment of the machine alignment automatically by way of previously described drives, the implementation of a controller is then advantageous.

FIG. 3 for this purpose shows, for example, the measured height b of the filling machine and an illustration of the measured inclination by use of two bars perpendicular to each other—corresponding to the indicator of an electronic spirit level.

Figure 4:
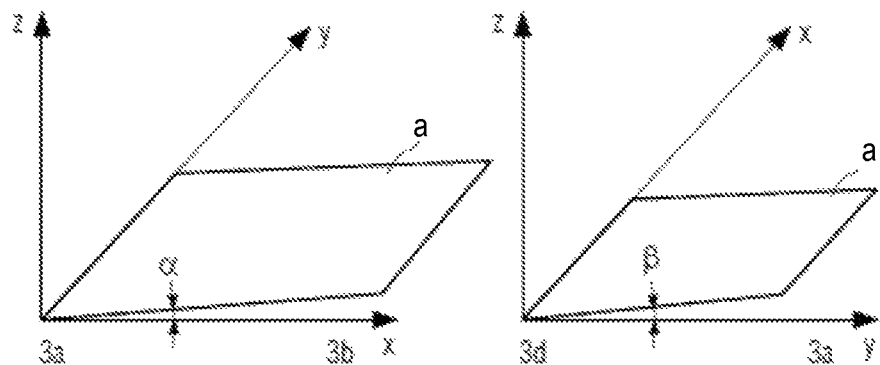
FIG. 4 very schematically shows a further possible indicator.

FIG. 4 shows another possible way of representation of the inclination of the filling machine. The left graph in FIG. 4 shows a representation of the measured actual assembly reference plane A in an x/y/z-coordinate system. The inclination measuring device 5 has there determined, for example, an inclination angle α of 3° relative to an x/y plane about the y axis, where the x/y plane is perpendicular to the gravitational vector, i.e. is formed horizontally. The x/y plane is there the target assembly reference plane. Furthermore, inclination measuring device 5 has determined, for example, that the actual assembly reference plane is inclined at an angle of 2° relative to the y/x-plane about the x-axis.

In addition, a target height for filling machine 1 was also in addition to the horizontal target assembly reference planes entered into calculation device 10. Moreover, the actual height of the filling machine was already determined as described above.

The calculation device can therefrom, e.g. via trigonometric functions, calculate which distance a the four corner regions (at certain points) of the base of filling machine 1 each must have to the ground 4 under the machine, or can calculate a change in distance Δa for each of the presently 4 reference points, for example, for the reason that the respective actual distances a at a reference point P1 were measured (by distance sensors 7) or calculated. In the calculation, distances a can additionally or alternatively also be converted to $a_{Fuβ}$ for positions at which the machine feet are arranged. It is then true that a=1, where 1 is the length of the foot between floor 4 and housing base 14. It is then true that Δ $a_{Fuβ}$=Δ1. Specific recommendations for action can then be outputted regarding to what height adjustment elements 9, i.e. machine feet 3, must be adjusted. An instruction could in one specific embodiment be, for example, that foot 3a must be adjusted downwardly by 2 cm, i.e. it must therefore be extended by Δ1, foot 3b must be adjusted downwardly by 3 cm, i.e. must be extended by Δ1, foot 3d must be adjusted upwardly by 1 cm, i.e. must be shortened by Δ1 and foot 3c must be adjusted upwardly by 1.5 cm. The distances can also be specified, for example, in revolutions.

In a specific example, e.g. $b_{Soll}$=105 cm, $b_{Ist}$=103 cm, α=1°, β=0.5°, $a_{Fuβ3a}$=20 cm, $a_{Fuβ3b}$=18 cm, $a_{Fuβ3c}$=21 cm, $a_{Fuβ3d}$=20.5 cm.

The operator can now manually adjust the adjustment device according to the instructions for action for the height-adjustable machine feet. For an appropriate adjustment to be performed accurately, it can be measured by a respective measuring device, for example, a distance meter 7a, b, c, d in each of the four corner regions, when specific adjustment has taken place because Δa is also known. Filling machine 1 comprises an indicator, either visually, e.g. in display 2. The indicator can also be effected as an acoustic feedback in that a beep signal is given off when the respective adjustment device has been correctly adjusted. If a feedback is provided, then the value Δ1 by which the respective foot must be adjusted must not be shown, but only the direction. The operator can stop the adjustment once the feedback has been received.

It is also possible that the adjustment is not done manually, but by a drive, as described above. Either the operator then operates the drive, where—as also presently described above—a feedback can occur when the actual position of machine foot 3 is reached, or automatic control of the drive can be effected, so that the adjustment of machine feet 3 is effected automatically by way of a control device. Once filling machine 1 is overall correctly aligned, i.e. inclination and height are correct, then this can also be visually or audibly indicated accordingly. The distance sensors for inspecting the adjustment of the individual machine feet can there be dispensed with and it can be determined, for example, via signals on the drive by what magnitude Δ1 the respective foot has been adjusted.

Alignment of the filling machine can be performed, for example, when first setting up a filling machine 1 in a production environment, after relocating a filling machine in a production environment, and when adjusting the machine height due to differing requirements, for example, for connecting various attached machines, or for ergonomic considerations.

Method 500 may be carried out by a controller, such as calculation unit 10 in FIG. 1, and may be stored at calculation unit 10 as executable instructions in non-transitory memory. Instructions for carrying out method 500 may be executed by the controller based on instructions stored on a memory of the calculation unit 10 and in conjunction with one or more sensors and actuators, including signals received from sensors 18, such as the sensors described above with reference to FIG. 1 and FIG. 2, and signals send to actuators. The calculation unit 10 may employ system actuators 20 such as drives for adjusting the height of the machine feet 3 or actuators for displaying recommendations on display 2, for example, according to the methods below.

Figure 5:
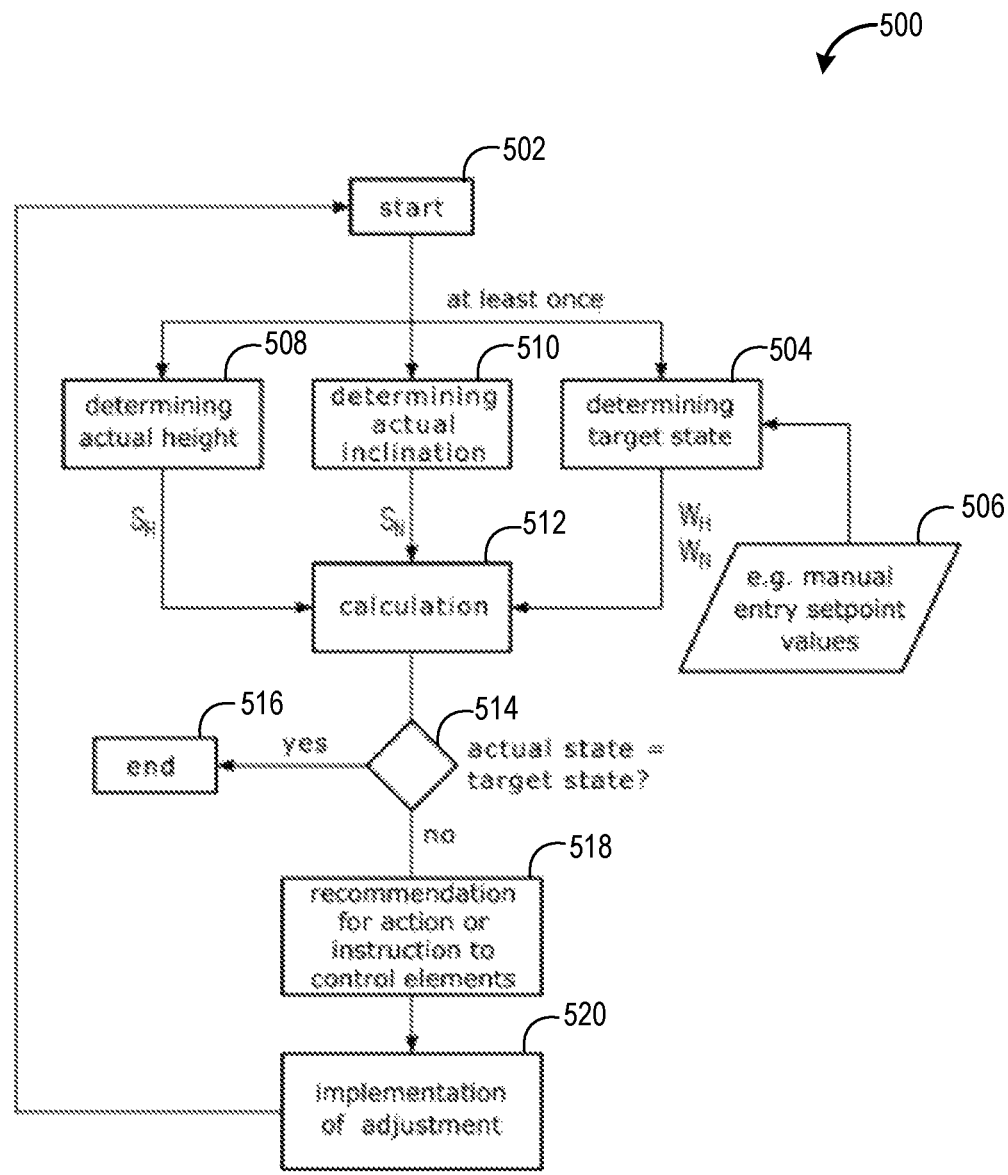
FIG. 5 shows a flow chart for a first example method according to the present disclosure.

FIG. 5 shows a flow chart for an example method 500 according to the present disclosure. Following a start of the method at 502, a target state of the filling machine first needs to be determined at 504. This can already occur in advance at the factory, where respective target values for the machine height or its inclination, respectively, can be entered into a control device and passed on to calculation device 10 or are already stored therein. However, manually entering the target values at 506 is also possible.

Respective target values of height $w_h$ or inclination $w_n$ are passed to calculation device 10, as shown by the arrow at 512. Now the actual height still needs to be determined at 508, as described above, in that the latter is measured, as described above, by a respective measuring device 7 or measured by an operator and entered via an input device 8. A respective actual value for height $s_H$ is also passed to calculation device 10. In addition, also the inclination of the filling machine is advantageously measured at 510, as explained above. Respective measured values $s_N$ corresponding to the actual inclination are also passed to calculation device 10. It is possible that the measured values are compared directly with the corresponding target values, or that values $s_H$ and $s_N$ are converted into values that depend on $s_H$ and $s_N$ and are then compared with corresponding target values. For example, a distance from given reference points to the ground, for example, in the four corner regions, can by use of trigonometric functions be determined from the angles by which assembly reference plane A is inclined about at least one axis, where this can also be indicated, as previously described. The actual state with respect to the inclination and the height is then in calculation device 10 compared with the target state at 514. If it is found that the actual state corresponds to the target state, then the method is terminated at 516. If the comparison shows that there is a deviation between the actual and the target state with respect to the height and/or inclination, then this can be displayed, for example, at an indicator. It is then advantageously in the calculation device calculated on the basis of the deviation of the actual to the target state by what magnitude and in which direction the filling machine must be adjusted via the adjustable machine feet by respectively $\Delta a$, and, according to a preferred embodiment, how respective adjustment elements 9 must be adjusted to obtain the target state with respect to the height and/or the inclination, where it is then in particular determined by what magnitude and in which direction the machine feet of the filling machine must be adjusted in height. A recommendation for action can thereafter be displayed on display 2 at 518 indicating at least the direction in which, and in some examples by what magnitude, the machine feet must each be adjusted in height. The calculation device can alternatively also pass signals to the control elements that drive the actuators of the adjustment devices of the machine feet at 520 according to the calculation at 514.

After the setting has been realized, the alignment method again starts to inspect whether the adjustment was successful. If it is then found that the actual state corresponds to the target state, then the method is terminated. Otherwise the method loop is again performed.

The invention claimed is:
1. A filling machine, comprising:
   a machine housing,
   a hopper,
   a stuffing tube,
   machine feet,
   a calculation unit in which measured values pertaining to an actual state of a height and/or an inclination of the filling machine and values pertaining to a target state of the height and/or inclination of the filling machine are stored, where said calculation unit comprises a comparison device for a comparison of the actual state with the target state in terms of the height and/or the inclination of the filling machine, and
   at least one adjustment element which is adjustable based on the comparison of the actual state to the target state,
   wherein said calculation unit is configured to calculate on a basis of a deviation between the actual state and the target state how said filling machine must be aligned via appropriate adjustment elements to obtain the target state with respect to the height and/or the inclination of the filling machine, including in which direction and by what magnitude ($\Delta a$) said filling machine must be adjusted in height by respective machine feet, and how respective adjustment elements must be adjusted to obtain the target state with respect to the height and/or the inclination of the filling machine, including in what direction and by what magnitude said machine feet of said filling machine must be adjusted in height, and
   wherein said filling machine comprises at least one measuring device for detecting the actual state with respect to the height and/or the inclination of the filling machine and/or an input device for entering measured values of the height and/or the inclination pertaining to the actual state of the filling machine.

2. The filling machine according to claim 1, wherein said filling machine further comprises an indicator that indicates a deviation of the actual state from the target state and/or indicates a recommendation for action to adjust respective adjustment elements, including for height adjustment of said machine feet of said filling machine.

3. The filling machine according to claim 1, wherein said at least one adjustment element respectively comprises a drive which is controlled.

4. The filling machine according to claim 3, wherein the drive is controlled automatically by said calculation unit until a corresponding target value has been reached.

5. The filling machine according to claim 1, wherein said filling machine comprises an optical and/or acoustic indicator which indicates when the target state of the height and/or the inclination of the filling machine has been reached, and/or indicates when an adjustment element has been correctly adjusted, such that said filling machine has been moved by the correct magnitude ($\Delta a$) in the correct direction by said respective adjustment element.

6. The filling machine according to claim 1, wherein each of said at least one measuring devices comprises at least one sensor, and where the at least one sensor is for measuring the actual state of the height and/or the inclination of the filling machine.

7. The filling machine according to claim 6, wherein the at least one sensor is a distance sensor.

8. The filling machine according to claim 1, wherein each of the at least one measuring devices comprises a plurality of sensors, and where each of the plurality of sensors is at different corners of said filling machine.

* * * * *